(12) United States Patent
Shui

(10) Patent No.: US 6,869,384 B2
(45) Date of Patent: Mar. 22, 2005

(54) EXERCISING BICYCLE

(76) Inventor: Su Chiang Shui, Chung Hsiao East Road 6 Sec., Taipei (TW)

( * ) Notice: Subject to any disclaimer, the term of this patent is extended or adjusted under 35 U.S.C. 154(b) by 527 days.

(21) Appl. No.: 10/100,105

(22) Filed: Mar. 19, 2002

(65) Prior Publication Data

US 2003/0181292 A1 Sep. 25, 2003

(51) Int. Cl.[7] .............................................. A63B 69/16
(52) U.S. Cl. ............................ 482/57; 280/215; 185/39
(58) Field of Search ........................... 482/57; 280/215, 280/217, 220, 221, 243, 251; 185/39, 41 R

(56) References Cited

U.S. PATENT DOCUMENTS

| 1,798,971 | A | * | 3/1931 | Clements | 280/215 |
| 2,908,356 | A | * | 10/1959 | Daarud | 185/39 |
| 4,108,459 | A | * | 8/1978 | Alvigini | 280/215 |
| 4,305,599 | A | * | 12/1981 | Houston | 280/212 |
| 5,016,726 | A | * | 5/1991 | Metcalf | 280/243 |
| 6,019,385 | A | * | 2/2000 | Kelley et al. | 280/217 |
| 6,053,830 | A | * | 4/2000 | Glaeser | 474/101 |
| 6,557,877 | B2 | * | 5/2003 | Dunkley | 280/215 |

* cited by examiner

Primary Examiner—Nicholas D. Lucchesi
Assistant Examiner—Tam Nguyen
(74) Attorney, Agent, or Firm—Birch, Stewart, Kolasch & Birch, LLP

(57) ABSTRACT

An exercising bicycle is proposed, having a rear hub thereof being mounted with a spring seat, a coupling member, a spiral spring, a turning mechanism and a braking system. The spring seat is formed with a shaft for being sleeved with the coupling member. The spiral spring is placed between the coupling member and spring seat. The turning mechanism is operatably driven by body motion of a user, whereby the coupling member is urged to rotate with respect to the spring seat for twisting the spiral spring tight, and the spring seat is actuated to rotate by resilient force from releasing the twisted spiral spring. By this mode of operation as to urge the turning mechanism for making the spiral spring store kinetic energy, and then to release the stored energy for driving the bicycle to move, the user can be elicited with a large amount of whole body exercise.

13 Claims, 9 Drawing Sheets

EXERCISING BICYCLE

FIELD OF THE INVENTION

The present invention relates to exercising bicycles, and more particularly, to an exercising bicycle by which a large amount of whole body exercise can be elicited.

BACKGROUND OF THE INVENTION

Bicycle exercise is well known to be health-beneficial exercise in operation of both transportation- and gym-purposed bicycles. Conventional bicycles are operatably driven by force exerted on pedals thereof. Nevertheless, the present inventor has found that, bicycles actuated by body motion, are also of great significance in concern of body health and exercise, as comparable to the conventional leg-driven bicycles. Therefore, the present invention is here to provide a novel type of bicycles operatably urged by body motion.

SUMMARY OF THE INVENTION

A primary objective of the present invention is to provide an exercising bicycle that is operatably driven by body motion in favor of body workout.

In order to achieve the foregoing and other objectives, the present invention proposes an exercising bicycle, characteristically comprising: a spring seat coaxially pivoted over a rear hub of the bicycle and having a shaft protruding outwardly; a coupling member rotatably sleeved about the shaft of the spring seat; a spiral spring mounted in space between the spring seat and the coupling member in a manner that, two ends of the spiral spring are fixed respectively to the spring seat and the coupling member; and a turning mechanism operatably driven by body motion of a user, whereby the coupling member is urged to rotate with respect to the spring seat for twisting the spiral spring tight, and the spring seat is actuated to rotate by resilient force generated from releasing the twisted spiral spring.

The turning mechanism comprises: at least an arm with a lower end thereof being rotatably and coaxially pivoted over the coupling member, and with an upper end thereof being adapted to be exerted with force applied from body of the user; and a unidirectional mechanism mounted between the arm and the coupling member, so as to urge unidirectional rotation of the coupling member with respect to the spring seat by means of turning motion of the arm.

Alternatively, the turning mechanism can be a linking mechanism. The linking mechanism comprises: a housing for covering internal components of the linking mechanism, the internal components comprising: a first lever with a lower end thereof being pivoted at the frame; a second lever with an upper end thereof being pivoted at the housing; a third lever with two ends thereof being pivotally connected to the first lever and the second lever, respectively; a coupling ring mounted at outer periphery of the ratchet of the coupling member; and a fourth lever with two ends thereof being pivotally connected to a lower end of the second lever and the coupling ring.

In order to urge the coupling member to twist the spiral spring tight through the use of the foregoing or conventional turning mechanism, the user needs to counteract resilient force of the spiral spring, by which a considerable amount of whole body exercise can be elicited. In the meantime, the spiral spring being twisted simultaneously stores kinetic energy, and thus, the twisted spring can be released with the stored energy if necessary for use to start up or ride the bicycle uphill.

BRIEF DESCRIPTION OF THE DRAWINGS

The present invention can be more fully understood by reading the following description with reference made to accompanying drawings, wherein.

DETAILED DESCRIPTIONS OF THE PREFERRED EMBODIMENTS

First Preferred Embodiment

Figure 2:
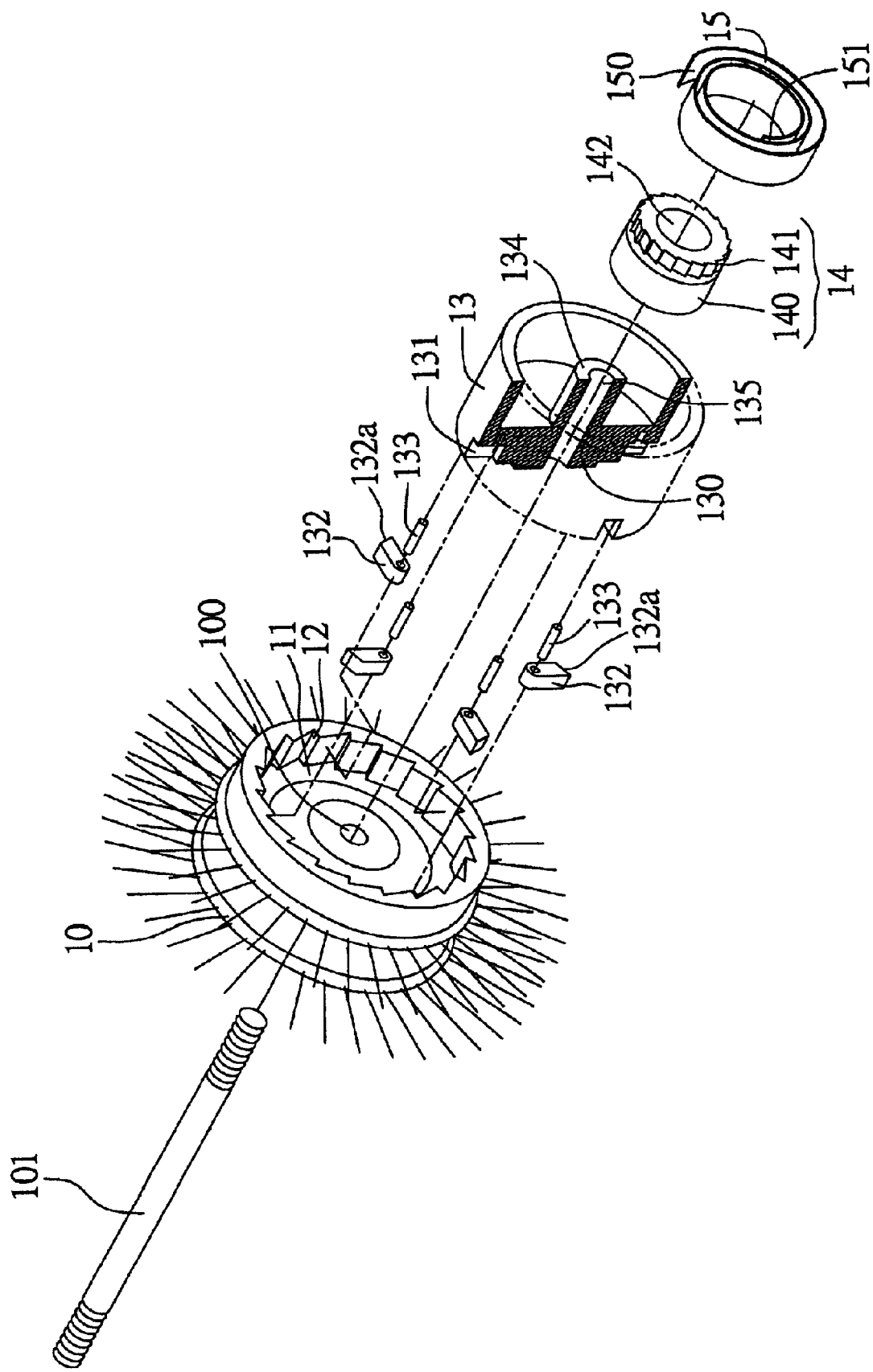
FIG. 2 is a dissected perspective view showing main components of the exercising bicycle of FIG. 1.
Figure 4:
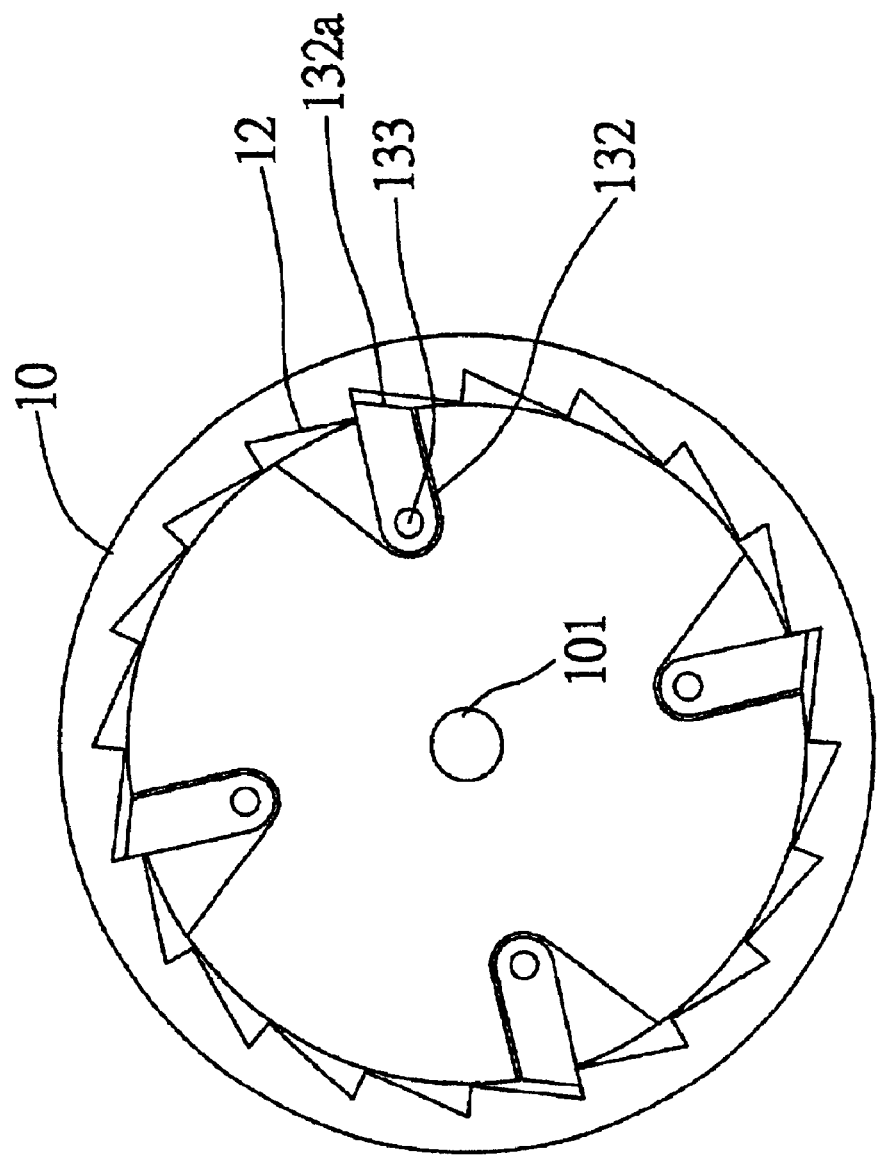
FIG. 4 is a cross-sectional view cutting along a line IV—IV of FIG. 3, showing coupling between teeth of an inner ratchet and claws of a spring seat.

As shown in FIGS. 2 and 4, the exercising bicycle of the present invention has a rear hub 10 being formed with a recessed portion 11 at a side thereof, an inner peripheral surface of which recessed portion 11 is adapted to form an inner ratchet 12. A cylindrical spring seat 13, which is dimensioned smaller in its outer diameter than an inner diameter of the recessed portion 11, is received in the recessed portion 11 in a manner as to allow only unidirectional rotation of the spring seat 13. At periphery of a bottom 130 of the spring seat 13 there are formed four grooves 131 at 90° intervals for placing claws 132 therein. Each of the claws 132 can freely swing and is pivotally fixed by a pivot 133 to the corresponding groove 131. A top portion 132a of the claw 132 protruding out of outer periphery of the spring seat 13, can be coupled to a tooth of the inner ratchet 12. As such, the spring seat 13 can only be urged to rotate rearwards with respect to the recessed portion 11.

Alternatively, the bottom periphery of the spring seat 13 can be adapted to form a ratchet, and the inner peripheral surface of recessed portion 11 can be provided with claws to be coupled to the ratchet; similarly, this achieves the rearward rotation of the spring seat 13 with respect to the recessed portion 11.

The spring seat 13 is integrally formed at a central position with a hollow shaft 134 having a shaft hole 135 that penetrates through the bottom 130 of the spring seat 13. The shaft hole 135 is dimensioned in diameter equal to an axle hole 100 of the hub 10, which allows an axle 101 to perforate through the axle hole 100 and the shaft hole 135 of the spring seat 13, when the spring seat 13 is mounted in the recessed portion 111. Such coaxial arrangement of the hub 10 and the spring seat 13, is capable of making the spring seat 13 rotate at a single direction with respect to the recessed portion 11.

Figure 3:
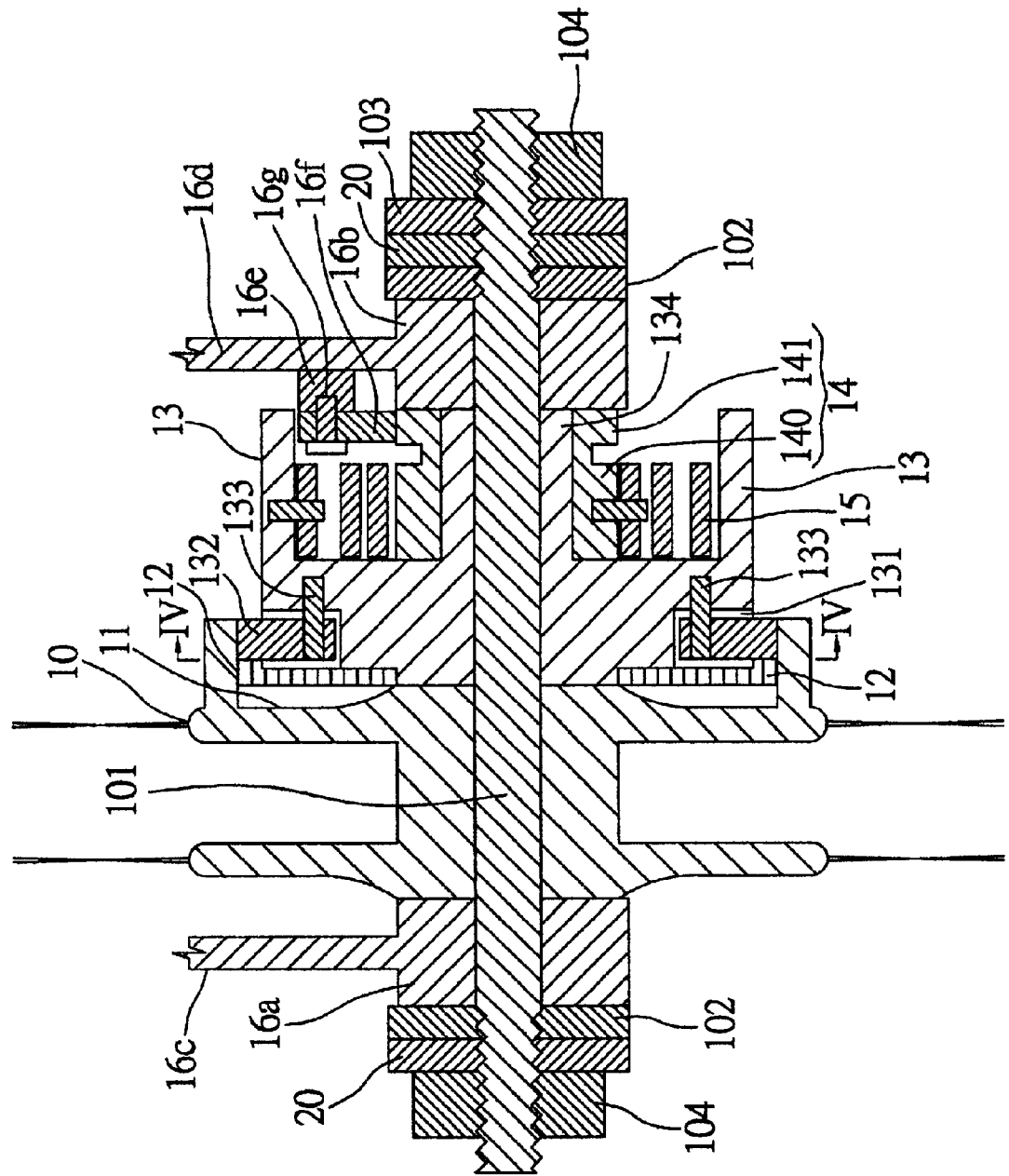
FIG. 3 is a cross-sectional view showing assembly of main components of the exercising bicycle of FIG. 1.

As shown in FIGS. 2 and 3, a coupling member 14 is rotatably sleeved about the hollow shaft 134 of the spring seat 13. Outer periphery of the shaft block 14 is adapted to form a ratchet 141, and the center of the coupling member 14 is provided with a shaft hole 142 for being engaged with the hollow shaft 134. A spiral spring 15 is sleeved about the coupling member 14 in a manner as to be interposed between the spring seat 13 and the coupling member 14, wherein an outer end 150 of the spiral spring 15 is fixed at an inner peripheral surface of the spring seat 13, and an inner end 151 thereof is fixed at an outer peripheral surface of the coupling member 14 by nails or pins.

Figure 1:
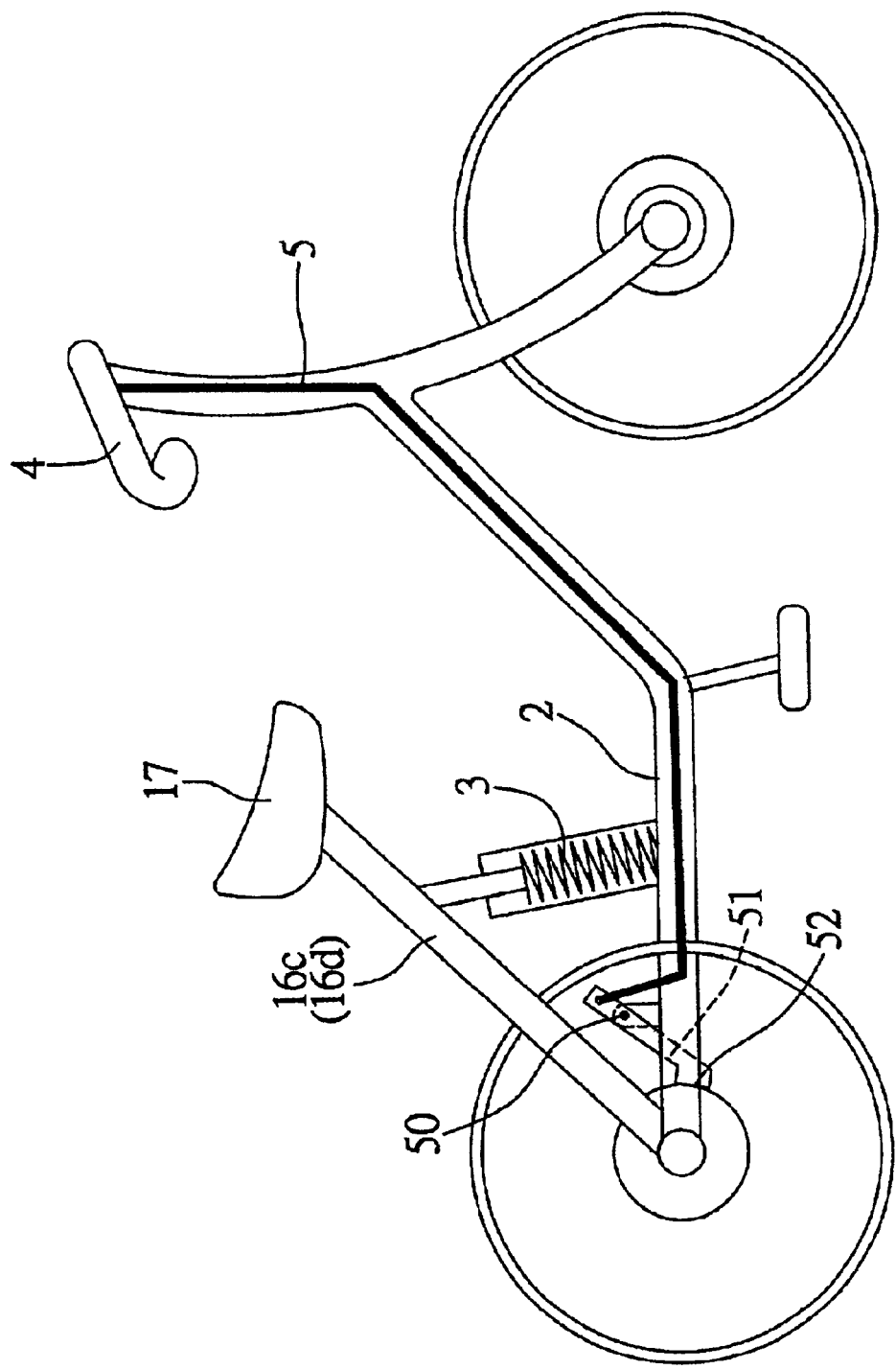
FIG. 1 is a schematic diagram showing overall configuration of an exercising bicycle of a first preferred embodiment of the invention.
Figure 5:
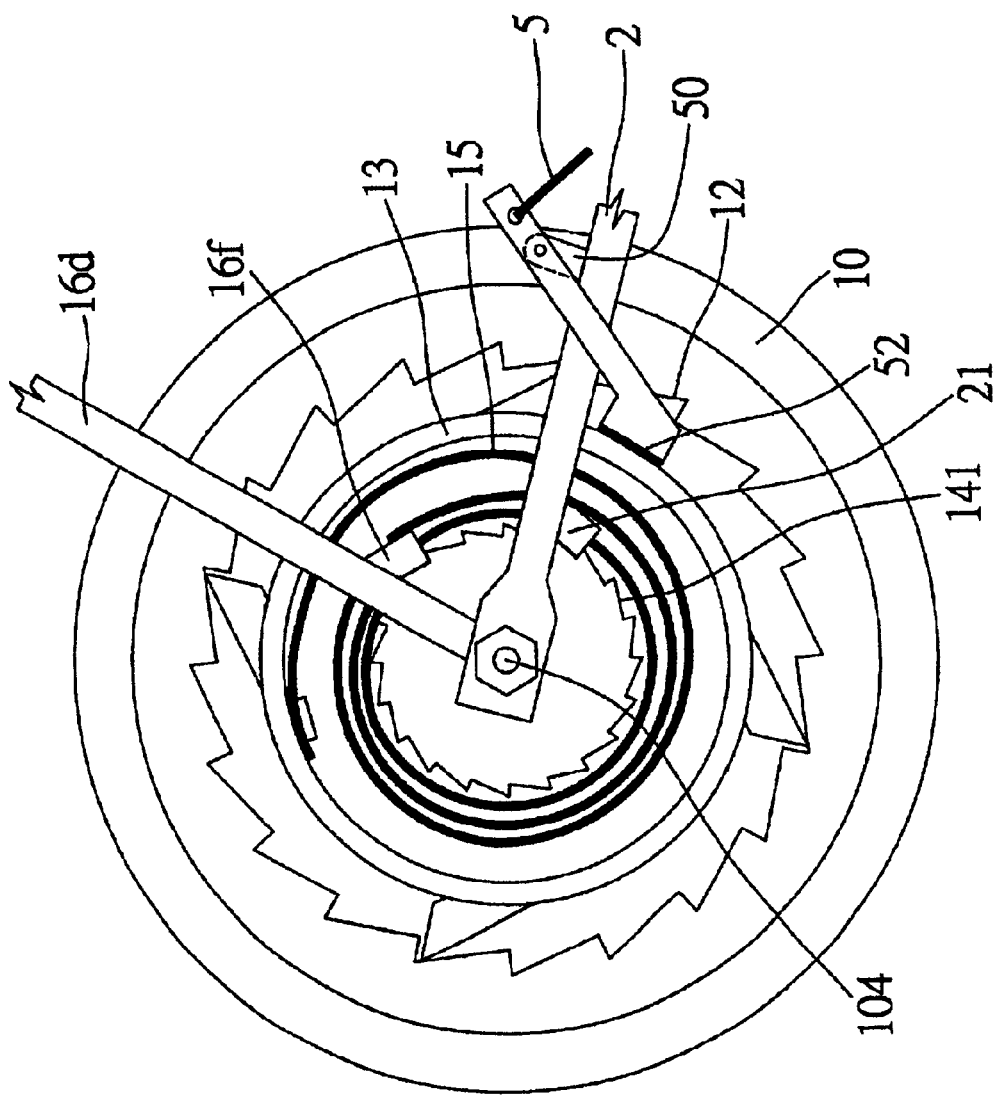
FIG. 5 is a side view showing assembly of main components of the exercising bicycle of FIG. 1.

As shown in FIGS. 1, 3 and 5, on the axle 101 beyond the rear hub 10 and the spring seat 13, turning shafts 16a, 16b are rotatably assembled in a manner that, the rear hub 10 and the spring seat 13 are interposed between the turning shafts 16a, 16b. The turning shafts 16a, 16b respectively extend to form arms 16c, 16d vertically oriented with respect to the axle 101, and the arms 16c, 16d are positioned at certain elevation to be jointed together where a saddle 17 is mounted for being exerted with force by a user. A lower portion of the arm 16d is formed with a protrusion 16e at a position facing the spring seat 13 and of similar elevation to the spring 15. A claw 16f for being coupled to the ratchet 141 of the coupling member 14, is rotatably pivoted to the protrusion 16e by a pin 16g. Then, the axle 101 is further sleeved with pads 102, 102 respectively beyond the turning shafts 16a, 16b, and in turn, terminals 20, 20 of a bicycle frame 2 are assembled on the axle 101 beside the pads 102, 102 respectively, so as to firmly fasten the bicycle frame 2 in position by nuts 104 with optional provision of a washer 103.

Moreover, a tension spring 3 is disposed between the joint portion of the arms 16c, 16d and the bicycle frame 2. When the arms 16c, 16d are pressed downwardly, the tension spring 3 provides resilient force for restoring the arms 16c, 16d and the saddle 17 back to original positions where the arms 16c, 16d are not exerted with external force.

Besides, a braking wire 5 is formed to extend from a bicycle handlebar 4 to a rear portion of the bicycle frame 2 nearby the hub 10. The braking wire 5 is further associated with a braking lever 51, which is pivotally fixed by a side arm 50 to the bicycle frame 2 at a position close to the hub 10, and a braking pad 52 is provided at an end of the braking lever 51 toward the spring seat 13. When the braking wire 5 is being pulled, the braking pad 52 is urged to press upon outer periphery of the spring seat 13, whereby rotation of the spring seat 13 driven by the spiral spring 15 can be impeded.

In addition, the bicycle frame 2 can be further formed with an assistant claw 21 at a position proximal to the ratchet 141 of the coupling member 14. The assistant claw 21 is engageable with the ratchet 141 so as to facilitate and assure the unidirectional rotation of the coupling member 14.

Based on the above-described structure, in operation of the exercising bicycle of the invention, a user sitting on the saddle 17 uses body weight and motion to exert downward force and press on the arms 16c, 16d, by which the turning arms 16a, 16b are cooperatively driven to rotate forward with respect to the axle 101. In the meantime, the claw 16f actuates the ratchet 141 to rotate the coupling member 14 forward, so as to allow the spring 15 interposed between the spring seat 13 and the coupling member 14 to tightly twist and retain kinetic energy. And, the braking pad 52 abuts against and presses upon the outer periphery of the spring seat 13, thereby prohibiting the spring seat 13 from rotating forward in response to motion of the spring 15. In other words, when the spring 15 tightly coils up, the spring seat 13 can stay firm in position, making the spring 15 store kinetic energy.

After that, the user releases the force applied on the arms 16c, 16d, and the turning arms 16c, 16d and the saddle 17 are restored to their original positions by means of the tension spring 3. At this time, as the claw 16f is engaged with teeth of the ratchet 141, the coupling member 14 can be still maintained in position even in the presence of resilient force from the twisted spring 15.

Therefore, according to the foregoing operation mode by continuously exerting and releasing force applied on the arms 16c, 16d through body motion, a large amount of body exercise can be elicited during operating the exercising bicycle of the invention. With the spring 15 being kept storing kinetic energy, once if forward motive force is required (e.g. during start-up or going uphill), the braking pad 52 can be released, by which the stored kinetic energy of the spring 15 drives the spring seat 13 to rotate, and rotation force of the spring seat 13 actuates the inner ratchet 12 and in turn the hub 10 to rotate forward by means of the claw 132. As a result, the bicycle readily moves forward.

For controlling the moving speed of the bicycle, it can be easily achieved by pulling the braking wire 5 and using the braking pad 52 to control the turning speed of the spring seat 13. This allows to control energy transferring rate from the spring seat 13 to the hub 10 whose rotation rate can thereby be adjusted to desirable level.

In conclusion, the bicycle of the invention is operatably driven by body motion of a user to move the bicycle, and therefore, provides an efficient way to achieve a considerable amount of whole body exercise for the user in a short period of time, instead of leg activity only as for the prior art. This is therefore greatly beneficial in respect of improving health and efficacy of exercising equipment.

Second Preferred Embodiment

Figure 6:
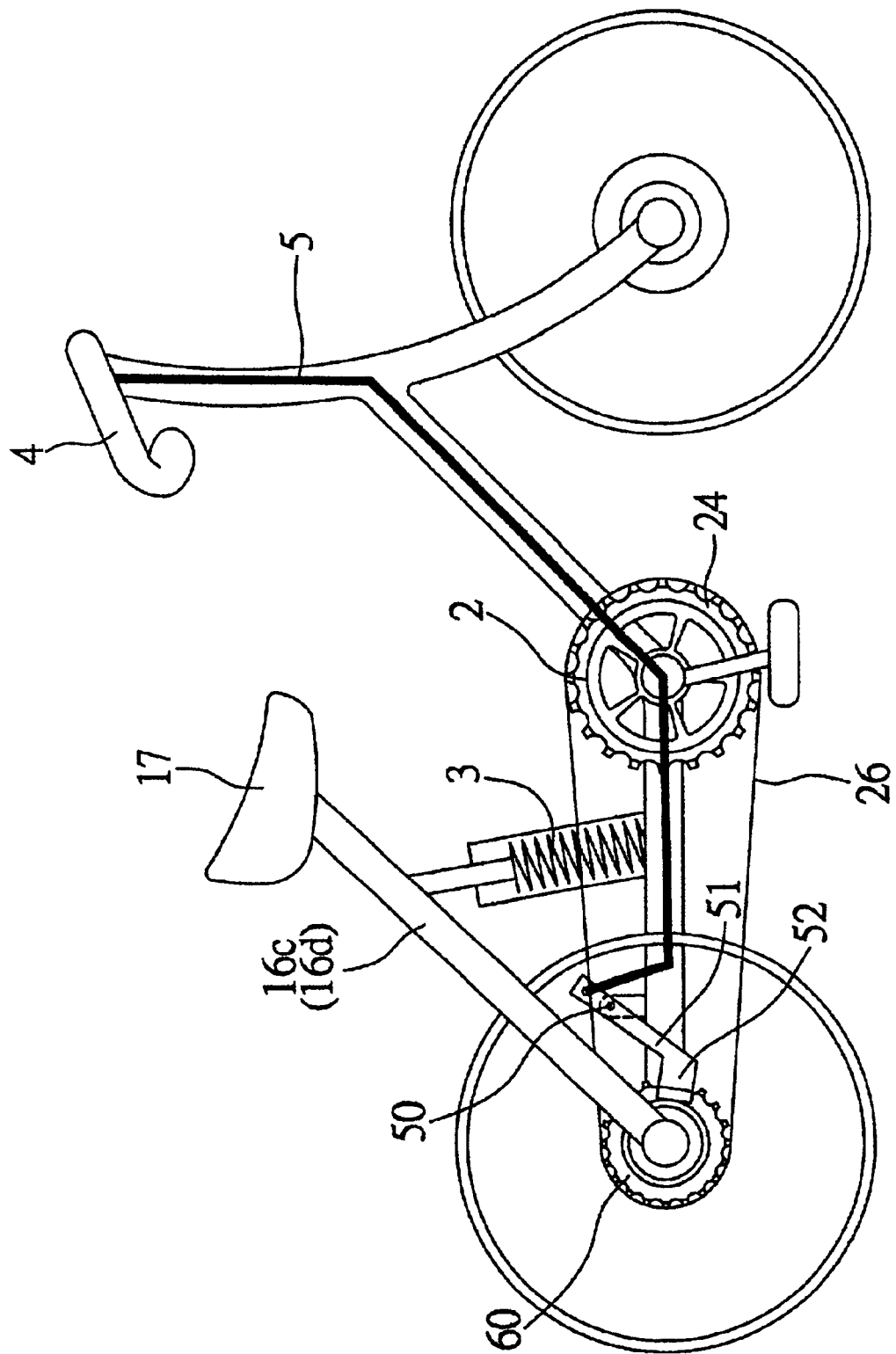
FIG. 6 is a schematic diagram showing overall configuration of an exercising bicycle of a second preferred embodiment of the present invention.
Figure 7:
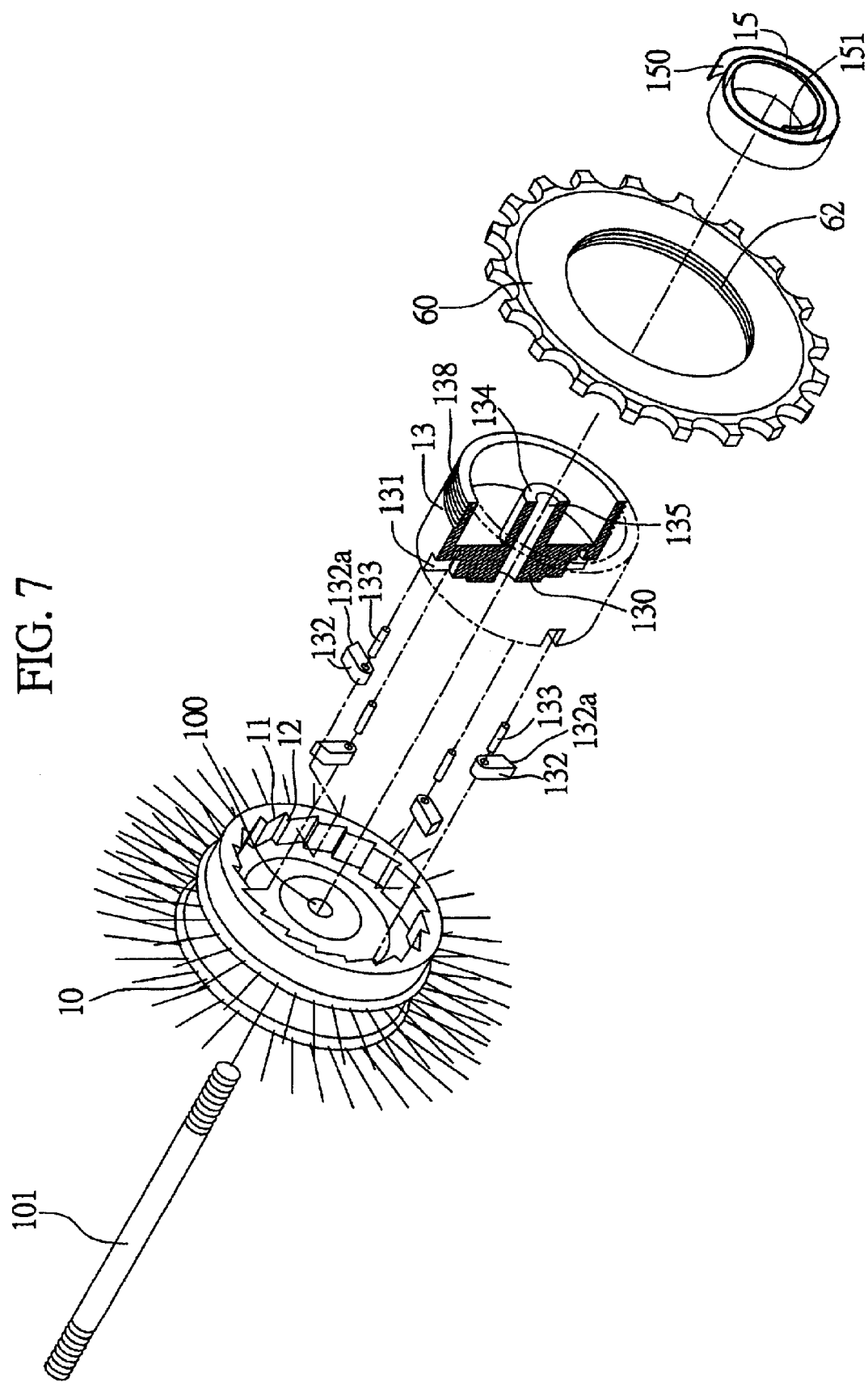
FIG. 7 is a dissected perspective view showing main components of the exercising bicycle of FIG. 6.

FIGS. 6 and 7 illustrate a second embodiment of the exercising bicycle of the invention. The second embodiment differs from the first embodiment primarily in that, a freewheel 60 is additionally mounted on the spring seat 13 of the exercising bicycle of the second embodiment. Other components of the second embodiment same as those of the first embodiment, are designated by the same reference numerals and not to be further detailed.

As shown in FIG. 7, the outer peripheral surface of the spring seat 13 is formed with threads 138 for use to be engaged with the freewheel 60, and a thread hole 62 is formed at the center of the freewheel 60 corresponding in position to the threads 138. Such a freewheel 60 here is structurally similar to a conventional freewheel used in a rear wheel of a bicycle, but only characterized with a relatively larger thread hole 62; therefore, other structural features and operating mechanisms of the freewheel 60 are not to be further described herein.

Further as shown in FIG. 6, a roller chain 26 is provided to operationally associate a sprocket 64 formed at the outer periphery of the freewheel 60 with a chainset 24 mounted at a middle portion of the bicycle frame 2. This makes the exercising bicycle of the present embodiment act as a transportation bicycle, besides the function of providing whole body exercise as purposed in the first embodiment.

Third Preferred Embodiment

Figure 8:
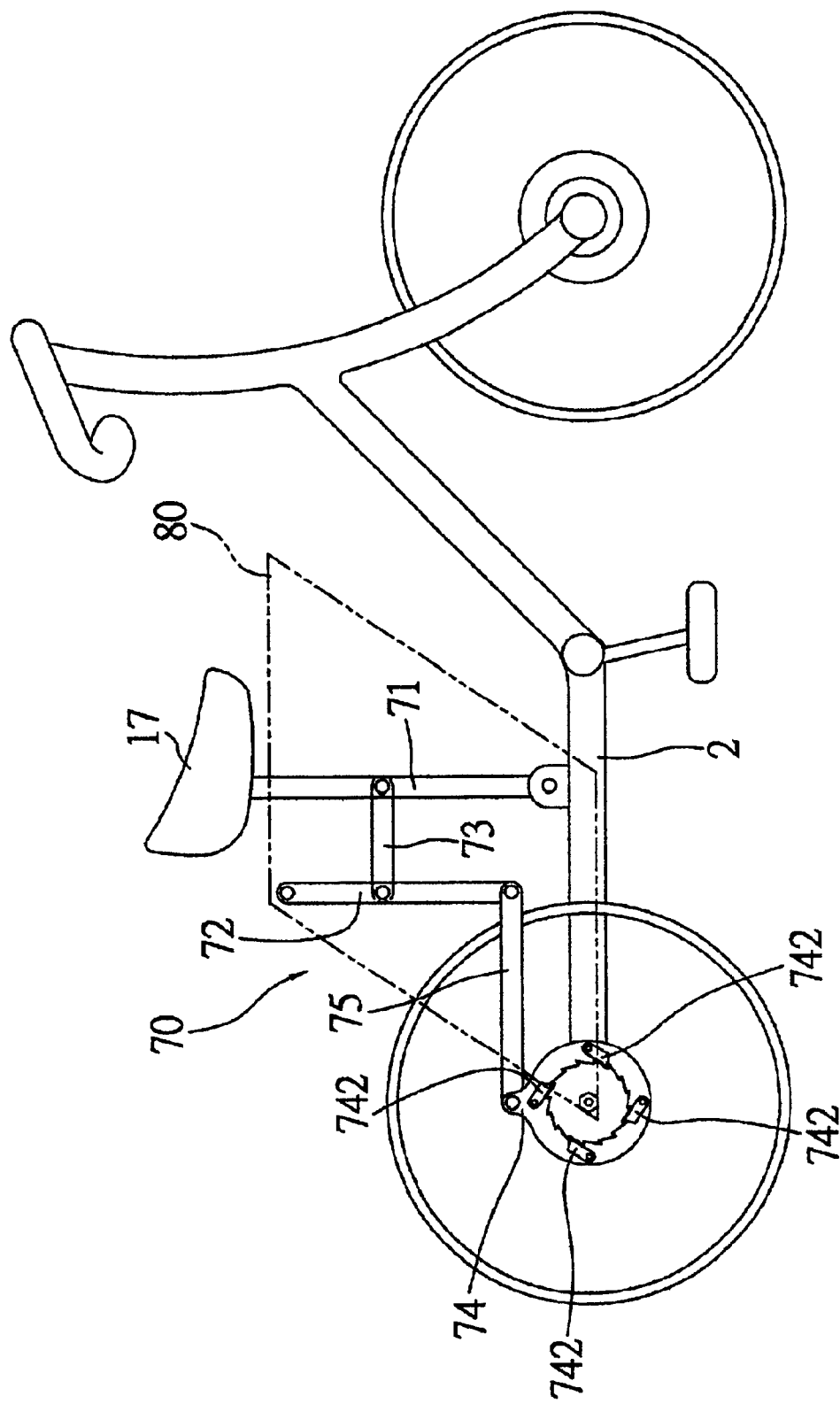
FIG. 8 is a schematic diagram showing overall configuration of an exercising bicycle of a third preferred embodiment of the present invention.

FIG. 8 reveals a third embodiment of the exercising bicycle of the invention. The third embodiment differs from the first embodiment in that, a linking mechanism 70 associated with the arms 16c, 16d is adopted to drive the operation of the coupling member 14 in the exercising bicycle of this embodiment. Other components of the third embodiment same as those of the first embodiment, are designated by the same reference numerals and not to be further detailed.

Figure 9:
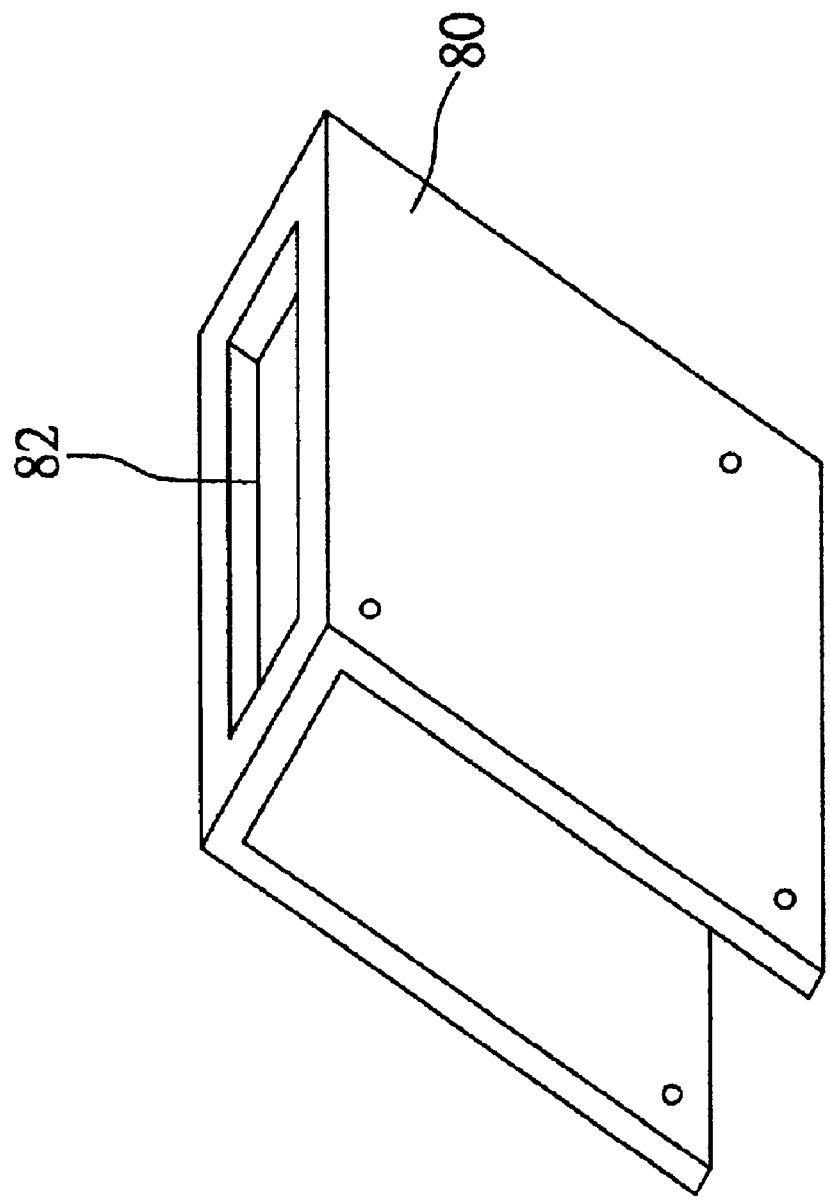
FIG. 9 is a perspective view of a housing provided in the exercising bicycle of FIG. 8.

As shown in FIG. 8, the linking mechanism 70 includes a first lever 71 with its lower end being pivoted at the bicycle frame 2; a second lever 72 having its upper end pivoted at a housing 80 (indicated by dotted lines in FIG. 8, with its structural perspective view illustrated in FIG. 9); a third lever 73 with its two ends being pivotally connected to the first lever 71 and the second lever 72, respectively; a coupling ring 74 mounted at outer periphery of the ratchet 141 of the coupling member 14; and a fourth lever 75 with its two ends being pivotally connected to a lower end of the second lever 72 and the coupling ring 74, respectively.

As shown in the drawing, the saddle 17 is assembled at the upper end of the first lever 71, and inner periphery of the coupling ring 74 are formed with four claws 742 at equal space intervals. Since the claws 742 are the same in function and operational mechanisms as the foregoing claw 16f, they are not further to be here repeated.

In operation of the exercising bicycle of this embodiment, a user only needs to hold the handlebars 4 and move the hips forward and backward on the saddle 17, whereby whole body exercise is elicited as well as energy can be stored in the spring 15.

Moreover, further in this embodiment, resilient force of the twisted spring 15 would transmit from the linking mechanism 70 to the first lever 71, making the first lever 71 swing backward until reaching peripheral edge of a through hole 82 formed on the housing 80 where the first lever 71 is blocked from further movement. Therefore, the spring 15 of this embodiment is functionally similar to the tension spring 3 used in the first embodiment for position restoring, and thus, the exercising bicycle of this embodiment can be structurally simplified without using the assistant claw 21 and the tension spring 3 as in the first embodiment.

Fourth Preferred Embodiment

The exercising bicycle of the fourth embodiment, based on the structure of the first embodiment, is characterized in using the linking mechanism 70 of the third embodiment in place of the arms 16c, 16d, the claw 16f and the assistant claw 21 of the first embodiment. Other components and their operational mechanisms and improvements of this embodiment are the same as those of the first and third embodiments, and thus they are not to be further illustrated by drawings and repeated with description herein.

Fifth Preferred Embodiment

The exercising bicycle of the fifth embodiment is structurally the same as that of the third embodiment, with addition of the freewheel 60, the chainset 24 and the roller chain 26 of the second embodiment. As other components and their operational mechanisms and improvements of this embodiment are the same as those of the second and third embodiments, they are not to be further illustrated by drawings and repeated with description herein.

The above-embodied exercising bicycles are respectively provided with a braking system including the side arm 50, the braking lever 51 and the braking pad 52 used in the first embodiment. Undoubtedly, this braking system can also be a common braking mechanism normally used in an ordinary bicycle.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. An exercising bicycle, comprising:
    a frame having a front portion and a rear portion;
    a front hub mounted at the front portion of the frame;
    a rear hub provided at the rear portion of the frame;
    a seating member coaxially pivoted over the rear hub and having a shaft protruding outwardly;
    a coupling member rotatably sleeved about the shaft of the seating member;
    a resilient mechanism mounted in space between the seating member and the coupling member in a manner that, two ends of the resilient mechanism are fixed respectively to the seating member and the coupling member; and
    a turning mechanism operatably driven by body motion of a user, whereby the coupling member is urged to rotate with respect to the seating member for twisting the resilient mechanism tight, and the seating member is actuated to rotate by resilient force generated from releasing the twisted resilient mechanism.

2. The exercising bicycle of claim 1, wherein the resilient mechanism is spiral spring sleeved about the coupling member in a manner as to be interposed between the seating member and the coupling member.

3. The exercising bicycle of claim 1, wherein the turning mechanism comprises:
    at least an arm with a lower end thereof being rotatably and coaxially pivoted over the coupling member, and with an upper end thereof being adapted to be exerted with force applied from body of the user; and
    a unidirectional mechanism mounted between the arm and the coupling member, so as to urge unidirectional rotation of the coupling member with respect to the seating member by means of turning motion of the arm.

4. The exercising bicycle of claim 3, wherein the unidirectional mechanism comprises: a ratchet formed at the coupling member, and a claw mounted at the arm.

5. The exercising bicycle of claim 3, wherein the unidirectional mechanism further comprises: a restoring mechanism for restoring the arm in position after being turned.

6. The exercising bicycle of claim 5, wherein the restoring mechanism is a spring.

7. The exercising bicycle of claim 2, wherein the spiral spring is a coiled sheet-like spring.

8. The exercising bicycle of claim 1, further comprising: a braking system for controlling rotation speed of the seating member driven by the resilient mechanism.

9. The exercising bicycle of claim 4, further comprising: an assisting claw mounted on the frame and engaged with teeth of the ratchet of the coupling member.

10. The exercising bicycle of claim 1, further comprising: a freewheel mounted on outer periphery of the seating member; and a roller chain coupled to a sprocket formed on the freewheel and a chainset formed at a middle portion of the frame so as to operationally associate the freewheel with the chainset, whereby the user is capable of operating pedals connected to the chainset to move the bicycle forward.

11. The exercising bicycle of claim 1, further comprising: a unidirectional mechanism provided between the rear hub and the seating member, so as to allow the seating member to urge the rear hub to rotate forward, wherein the rear hub is capable of rotating forward even if the seating member is still in position.

12. The exercising bicycle of claim 11, wherein the unidirectional mechanism comprises: a ratchet formed at the rear hub, and a claw mounted at the seating member.

13. The exercising bicycle of claim 12, wherein the turning mechanism is a linking mechanism, comprising:

- a housing for covering internal components of the linking mechanism, the internal components comprising:
- a first lever with a lower end thereof being pivoted at the frame;
- a second lever with an upper end thereof being pivoted at the housing;
- a third lever with two ends thereof being pivotally connected to the first lever and the second lever, respectively;
- a coupling ring mounted at outer periphery of the ratchet of the coupling member; and
- a fourth lever with two ends thereof being pivotally connected to a lower end of the second lever and the coupling ring.

* * * * *